United States Patent [19]

Ebrahim et al.

[11] Patent Number: 5,706,463
[45] Date of Patent: Jan. 6, 1998

[54] CACHE COHERENT COMPUTER SYSTEM THAT MINIMIZES INVALIDATION AND COPYBACK OPERATIONS

[75] Inventors: Zahir Ebrahim, Mountain View; Satyanarayana Nishtala, Cupertino; William Van Loo, Palo Alto; Kevin Normoyle; Leslie Kohn, both of Mountain View; Louis F. Coffin, III, San Jose, all of Calif.

[73] Assignee: Sun Microsystems, Inc., Mountain View, Calif.

[21] Appl. No.: 854,418

[22] Filed: May 12, 1997

Related U.S. Application Data

[63] Continuation of Ser. No. 423,016, Mar. 31, 1995, abandoned.

[51] Int. Cl.$^6$ .................................................. G06F 12/08
[52] U.S. Cl. ..................... 395/447; 395/472; 395/473; 395/470; 395/471
[58] Field of Search .................................... 395/452, 472, 395/447, 470, 471, 473

[56] References Cited

U.S. PATENT DOCUMENTS

| 4,228,503 | 10/1980 | Waite et al. | 395/448 |
|---|---|---|---|
| 4,977,498 | 12/1990 | Rastegar et al. | 395/455 |
| 5,036,459 | 7/1991 | den Haan et al. | 395/200.14 |
| 5,297,269 | 3/1994 | Donaldson et al. | 395/472 |
| 5,303,362 | 4/1994 | Butts, Jr. et al. | 395/448 |
| 5,319,753 | 6/1994 | MacKenna et al. | 395/868 |
| 5,428,799 | 6/1995 | Woods et al. | 395/739 |
| 5,434,993 | 7/1995 | Liencres et al. | 395/460 |

FOREIGN PATENT DOCUMENTS

| 0 317 481 | 11/1988 | European Pat. Off. . |
|---|---|---|
| 0 380 842 | 6/1989 | European Pat. Off. . |
| 0 358 863 | 3/1990 | European Pat. Off. . |
| 0 468 831 | 6/1991 | European Pat. Off. . |
| 0 507 571 | 4/1992 | European Pat. Off. . |
| 0 537 899 | 9/1992 | European Pat. Off. . |
| 0 507 063 | 10/1992 | European Pat. Off. . |
| 0 598 535 | 11/1993 | European Pat. Off. . |
| 0 644 489 | 9/1994 | European Pat. Off. . |
| WO 93/00638 | 6/1992 | WIPO . |

OTHER PUBLICATIONS

Cvijovic Miomirka and Mojca Kunc, "An approach to the design of distributed real–time operating systems", Microprocessors and Microsystems, vol. 16, No. 2, 1992; pp. 81–89.

Alpert et al., "Architecture of the NS32532 Microprocessor", The Computer Society of the IEEE, 1987 IEEE International Conference on Computer Design: VLSI in Computers & Processors, 1987;pp. 168–172.

IEEE 1992, A Second–Level Cache Controller for A Super–Scalar SPARC Processor, Sun Microsystems Computer Corporation, pp. 142–151; Feb. 1992.

IEEE Rochester's Intelligent Gateway, vol. 15, No. 10, Oct. 1982, pp. 54–68.

*Primary Examiner*—Tod R. Swann
*Assistant Examiner*—Reginald G. Bragdon
*Attorney, Agent, or Firm*—Blakely Sokoloff Taylor & Zafman

[57] ABSTRACT

A multi-processor computer system is disclosed that reduces the occurrences of invalidate and copyback operations through a memory interconnect by disabling a first write optimization of a cache coherency protocol for data that is not likely to be written by a requesting processor. Such data include read-only code segments. The code segments, including instructions and data, are shared among the multiple processors. The requesting processor generates a Read to Share Always request upon a cache miss of a read-only datablock, and generates a Read to Share request otherwise. The Read to Share Always request results in the datablock stored in cache memory being labeled as in a "shared" state, while the Read to Share request results in the datablock being labeled as in an "exclusive" state.

19 Claims, 6 Drawing Sheets

CACHE COHERENT COMPUTER SYSTEM THAT MINIMIZES INVALIDATION AND COPYBACK OPERATIONS

This is a Continuation of application Ser. No. 08/423,016, filed Mar. 31, 1995, now abandoned.

BACKGROUND OF THE INVENTION

1. Field of the Invention

The present invention pertains to the field of computer systems. More particularly, this invention relates to a multiprocessor computer system including a mechanism for reducing the occurrences of invalidation operations and copyback operations for maintaining data coherency.

2. Background

Prior multiprocessor computer systems typically include a set of processor subsystems coupled to a main memory subsystem. Such a main memory subsystem typically provides instruction and data storage areas for the processors in the system, as well as storage areas for data structures that are shared among the processors of the system. Such shared data structures enable inter processor communication and data and code sharing between the processors.

Typically, the processor subsystems are coupled to the main memory subsystem via a physical interconnect such as a common bus or a switched interconnect data path. Such an interconnection may function as either a simple circuit switched interconnection or a more complex packet switched interconnection that enables out of order transactions.

In addition, each processor subsystem typically includes an associated external cache memory. Such an external cache memory usually stores selected data blocks from the main memory subsystem. Typically, such an external cache memory provides fast processor access to the cached data blocks by avoiding fetches to the main memory subsystem for datablocks that are stored in the cache.

Such a multiprocessor computer system, whether packet switched or circuit switched, typically implements a protocol for maintaining data coherency between the main memory and the corresponding datablocks stored in the cache memories. Each cache memory typically includes a set of tags that indicate the status of the cached datablocks. For example, one type of cache coherency protocol which is referred to as the MOESI protocol maintains a set of five states for datablocks stored in the cache memories. The states include an "invalid" state, a "shared" state, an "exclusive" state, and a "modified" state.

In such a system, if a first processor executes a bad memory instruction targeted for a datablock that is not in the external cache for the first processor then the appropriate datablock is externally fetched. Typically, the first processor issues a read_to_share (RDS) transaction that specifies the missing datablock to the memory interconnect. Such a read_to_share (RDS) transaction usually returns the missing datablock to the external cache of the first processor and the tags associated with that datablock in the external cache of the first processor are modified to indicate that the datablock is cached in a "shared" state.

A multiprocessor computer system may implement a first write optimization to such a MOESI protocol. With such an optimization, a read_to_share (RDS) transaction from the first processor returns the missing datablock and modifies the tags associated with the missing datablock to indicate the "exclusive" state if no other cache memory owns the datablock. Thereafter, if the first processor executes store instructions to that exclusive datablock then no other cache coherency messages are transferred through the memory interconnect. Such an optimization eliminates an invalidation or copyback operation through the memory interconnect that would otherwise occur if the missing datablock had been cached in the "shared" state.

Such a write optimization to the MOESI protocol is usually based on an assumption that a read_to_share (RDS) transaction from the first processor targeted for a datablock not owned by any other processor corresponds to a private datablock for the first processor. If such an assumption is wrong and the missing datablock is not private data then a second processor may later issue a read_to_share (RDS) transaction through the memory interconnect for that datablock. In such a case, the first processor must usually supply the missing datablock to the second processor on a copyback operation even though the first processor may not have modified the datablock and even though the missing datablock is available from main memory.

Unfortunately, such data sourcing by the external cache memory of the first processor cache may interfere with the operation of the first processor because such outside contention interferes with instruction execution by the first processor. In addition, such an unnecessary invalidation or copyback operation through the memory interconnect generates extra traffic in the interconnect that could otherwise be avoided. Moreover, the throughput of such a system is typically reduced if data is supplied from a cache memory on a read_to_share (RDS) transaction rather than the main memory because a main memory is usually optimized for high bandwidth access.

SUMMARY OF THE INVENTION

A computer system is disposed that selectively enables and disables a first write optimization of a cache coherency protocol for data that is not likely to be written by a requesting processor. The disabling of the first write optimization reduces copyback and invalidation messages in a multiprocessor system during cache misses to read-only memory pages or instruction fetches. Advantages are realized in computer systems that share instructions among processors in read-only code segments such as may be found with dynamic link libraries. Advantages are also realized for shared read-only constant data and for process migration from processor to processor.

The computer system includes a set of processor subsystems and a memory interconnect. Each processor subsystems includes an external cache memory including external tags and the memory interconnect maintains a set of duplicate tags that correspond to the external tags. A processor subsystem generates a read to share always (RDSA) request upon a cache miss to a read-only datablock and generates a read to share (RDS) request otherwise. The memory interconnect enables access to a shared memory and controls the cache state transitions of the external tags and the duplicate tags to selectively enable or disable the first write optimization.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
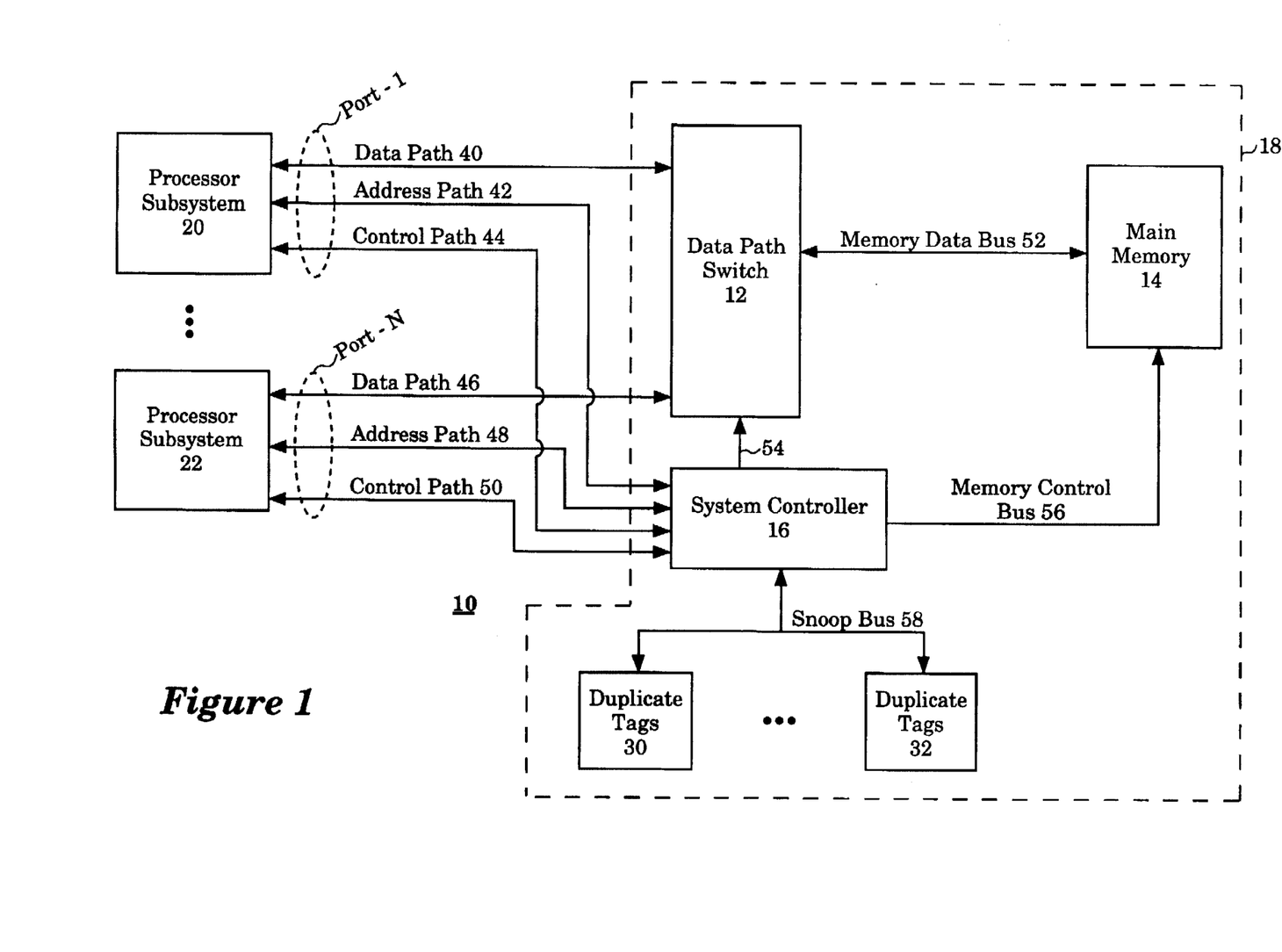
FIG. 1 illustrates a computer system which comprises a set of processor subsystems and a memory interconnect subsystem wherein each of the processor subsystems includes a cache memory.

FIG. 1 illustrates a computer system 10 for one embodiment. The computer system 10 comprises a set of processor subsystems 20–22 and a memory interconnect subsystem 18. Each of the processor subsystems 20–22 includes an L2 cache memory.

The memory interconnect subsystem 18 provides shared access to a main memory 14 to the processor subsystems 20–22. The processor subsystems 20–22 communicate with the memory interconnect subsystem 18 via a set of memory ports 1–N. For example, port 1 for the processor subsystem 20 comprises a data path 40, an address path 42, and a control path 44, and port N for the processor subsystem 22 comprises a data path 46, an address path 48 and a control path 50.

The memory interconnect subsystem 18 includes a data path switch 12 to the main memory 14, a system controller 16, and a set of duplicate tags 30–32. For one embodiment, the data path switch 12 is a cross bar switch controlled by the system controller 16 via a set of control signals 54. The data path switch 12 enables data path access to the main memory 14 via the data path of each port 1–N including the data path 40 and the data path 46.

The system controller 16 functions as a memory controller by decoding the addresses received from the processor subsystems 20–22 and by generating memory control signals including row address select (RAS) and column address select (CAS) signals to the main memory 14 via a memory control bus 56.

The system controller 16 also implements a cache coherency mechanism for the computer system 10. The system controller 16 maintains sets of duplicate tags 30–32. The duplicate tags 30–32 reflect the tags corresponding to the external caches of the processor subsystems 20–22. For example, the duplicate tags 30 correspond to the tags of the external cache memory in the processor subsystem 20 and the duplicate tags 32 reflect the information stored in the tags of the external cache memory in the processor subsystem 22. The system controller 16 performs tag look up and tag modify operations to the duplicate tags 30–32 via a snoop bus 58.

The system controller 16 receives memory access requests from the processor subsystems 20–22 via the address path of each port 1–N including the address path 42 and the address path 48. The system controller 16 arbitrates among the requests from the processor subsystems 20–22 and configures the data path switch 12 to provide the necessary connections for access to the main memory 14 via a memory data bus 52 or for processor subsystem to processor subsystem data transfers. The system controller 16 responds with cache state transition control messages and other information via the appropriate control path.

The memory access requests include, for example, read_to_share (RDS) requests and read_to_share_always (RDSA) requests. The processor subsystems 20–22 use a read_to_share (RDS) request to the system controller 16 to retrieve a missing cache block after a load miss to the corresponding external cache memory if the load is targeted for read-write data. On the other hand, the processor subsystems 20–22 use a read_to_share_always (RDSA) request to the system controller 16 to retrieve a missing cache block after a load miss to the corresponding external cache memory if the load is targeted for read-only data such as instruction code or other types of data not likely to be written. Such read only misses may correspond to instruction cache misses or data cache misses data marked as read-only by a memory management mechanism.

The system controller 16 processes a read_to_share (RDS) or a read_to_share_always (RDSA) request by performing a tag lookup on the specified datablock via the snoop bus 58. The system controller 16 reads the duplicate tags 30–32 via the snoop bus 58 to determine the cache state of the specified datablock. The system controller 16 configures the data path switch 12 to provide the proper source for the specified datablock for the read_to_share (RDS) or the read_to_share_always (RDSA) transaction. The appropriate source may include, for example, the main memory 14 or one of the external caches of the processor subsystems 20–22 according to the state of the duplicate tags 30–32.

The system controller 16 transfers messages via the control path of the ports 1–N to control the cache state transitions in the processor subsystems 20–22 involved in the read_to_share (RDS) or read_to_share_always (RDSA) transaction. The system controller 16 also updates the cache states via the snoop bus 58 for the duplicate tags 30–32 involved in the read_to_share (RDS) or read_to_share_always (RDSA) transaction.

Figure 2:
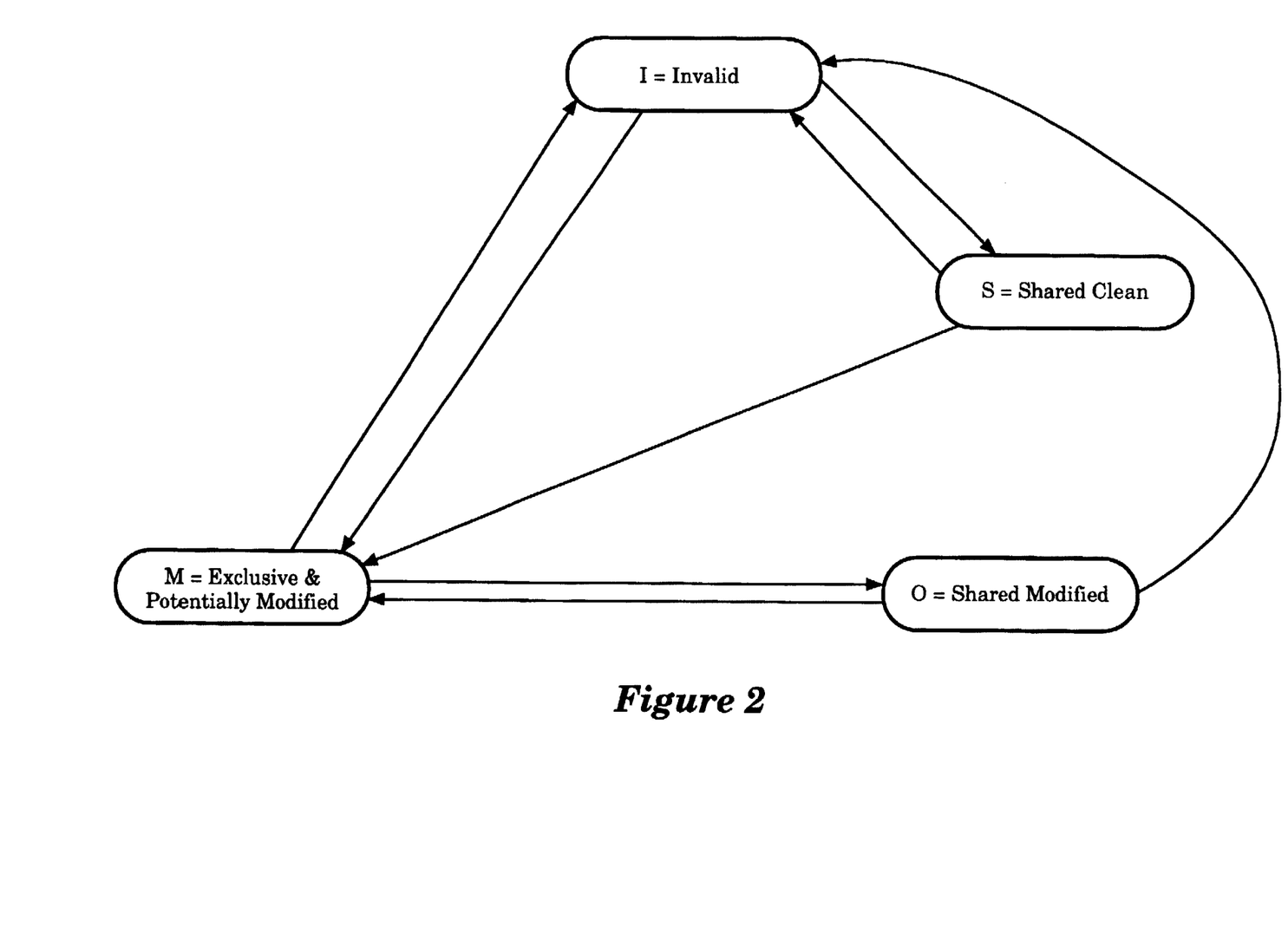
FIG. 2 illustrates the cache coherency protocol of the duplicate tags in the memory interconnect subsystem for one embodiment.

FIG. 2 illustrates the cache coherency protocol of the duplicate tags 30–32 for one embodiment. The system controller 16 maintains the duplicate tags 30–32 according to an MOSI cache coherency protocol which includes an "invalid" (I) state, a "shared clean" (S) state, a "shared modified" (O) state, and an "exclusive and potentially modified" (M) state.

Figure 3:
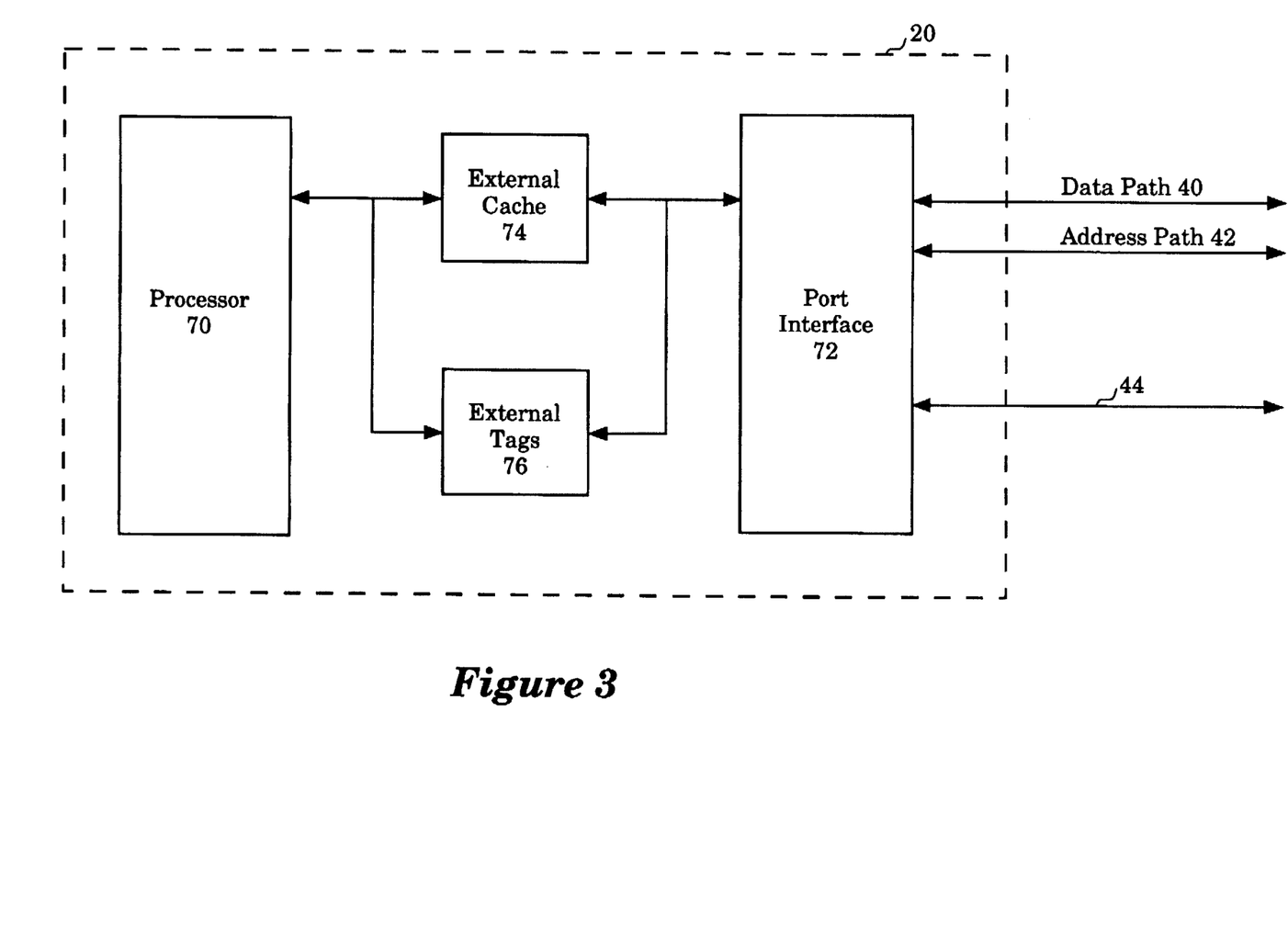
FIG. 3 illustrates a processor subsystem which includes a processor, an external cache and associated set of external tags, and a memory interconnect port interface.

FIG. 3 illustrates the processor subsystem 20 for one embodiment. The processor subsystem 20 comprises a processor 70, an external cache 74, and associated set of external tags 76, and a port interface 72. Other processor subsystems in the computer system 10, such as the processor subsystem 22, may be implemented in a similar fashion as that shown for the processor subsystem 20.

The processor 70 issues memory load and memory store operations to the external cache 74. A cache "miss" to the external cache 74 causes the port interface 72 to issue a cache request to the system controller 16 using a message packet transferred via the address path 42. The cache requests issued include, for example, read_to_share_always (RDSA) and read_to_share (RDS) cache requests. The message packet transferred via the address path 42 includes a header that specifies the request type and an address that specifies the datablock of the cache request.

After the system controller 16 configures the data path switch 12 to source the appropriate data for the missing datablock according to the state of the duplicate tags 30–32, the port interface 72 receives the missing datablock via the data path 40. The port interface 72 receives cache state control messages from the system controller 16 via the control path 44. The cache state control messages determine the cache state transitions for the newly fetched missing datablock stored in the external cache 74.

Figure 4:
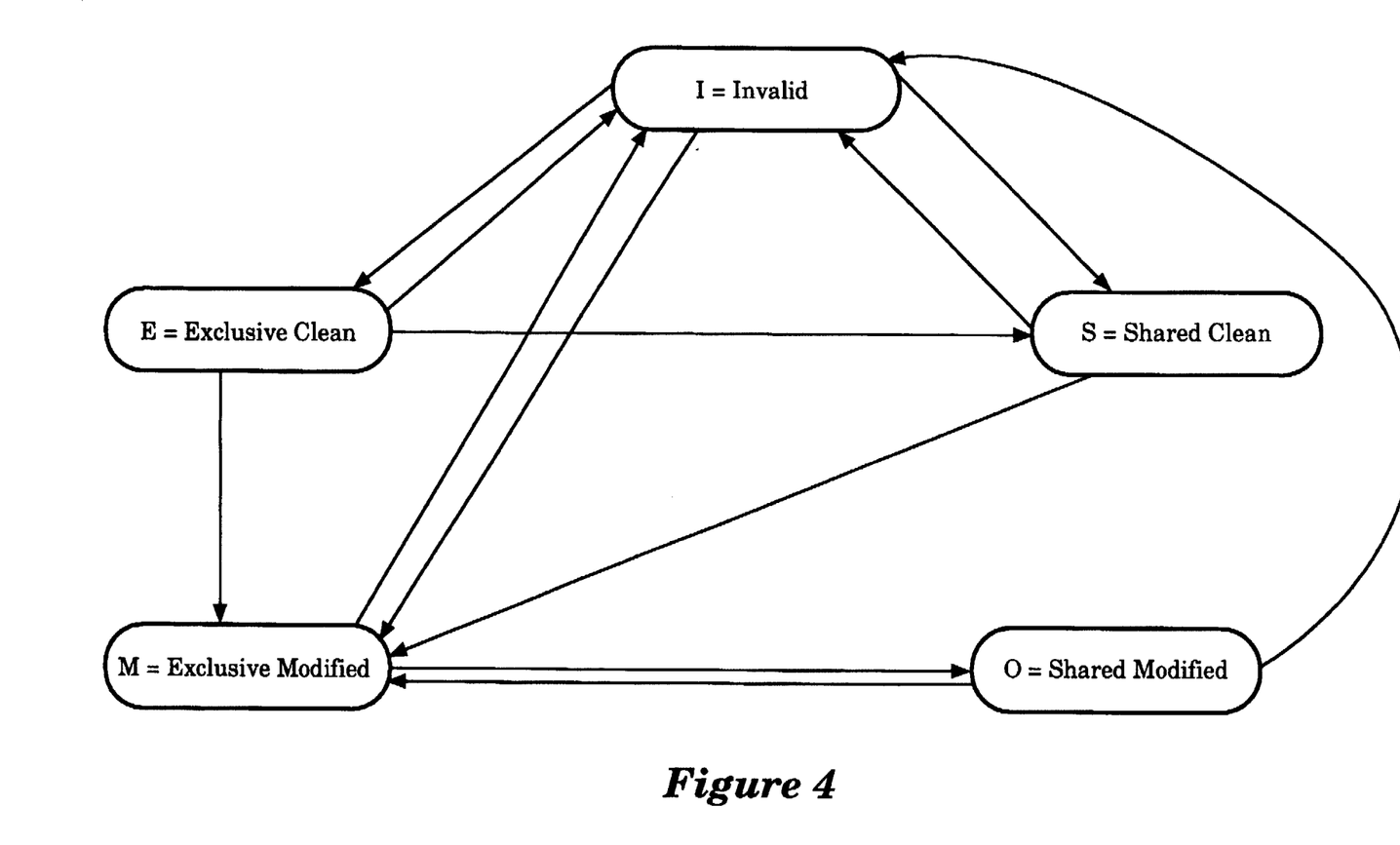
FIG. 4 illustrates the cache coherency protocol of the external tags of a processor subsystem for one embodiment.

FIG. 4 illustrates the cache coherency protocol of the external tags 76 for one embodiment. The external cache 74 maintains the external tags 76 according to an MOESI cache coherency protocol which includes an "invalid" (I) state, a "shared clean" (S) state, an "exclusive clean" (E) state, a "shared modified" (O) state, and an "exclusive modified" (M) state.

For an alternative embodiment, the external cache 74 maintains the external tags 76 according to an MESI cache coherency protocol while the system controller 16 maintains the duplicate tags 30–32 according to an MSI cache coherency protocol. Such an embodiment enables the memory interconnect subsystem 18 to function as a reflective memory wherein a copyback operation on a load miss to a "modified" datablock causes the datablock to be written back into the main memory 14 and causes the requesting processor to transition to the "shared" state.

Figure 5:
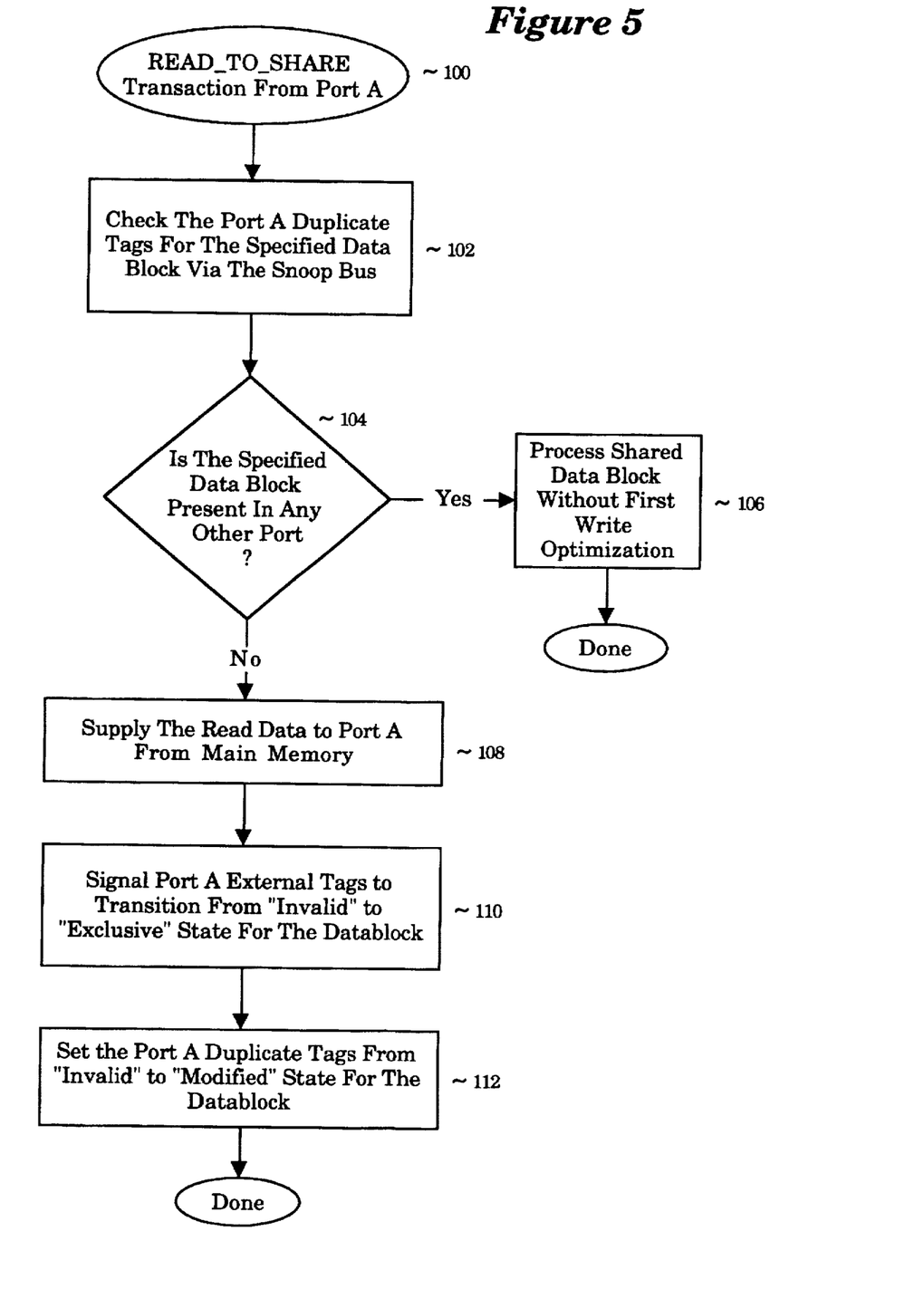
FIG. 5 illustrates the handling of a read_to_share (RDS) transaction with write optimization by the system controller.

FIG. 5 illustrates the handling of a read_to_share (RDS) transaction with write optimization by the system controller 16. The write optimization illustrated may be referred to as a first write optimization to the cache coherence protocol of the computer system 10.

At block 100, the system controller 16 receives a read_to_share (RDS) transaction from one of the processor subsystems 20–22 coupled to one of the memory ports 1–N hereinafter referred to as memory Port A.

At block 102, the system controller 16 reads the duplicate tags that correspond to the memory Port A via the snoop bus 58 for the specified datablock of the read_to_share (RDS) transaction. At decision block 104, if the specified datablock is not owned by any other memory port 1–N, then control proceeds to block 108.

Otherwise control proceeds to block 106 to process the shared datablock without write optimization. At block 108, if the duplicate tags indicate "shared clean" (S)state, then the datablock for the read_to_share (RDS) is supplied to Port A from the main memory 14. If the duplicate tags indicate one of the modified states M or O, then the system controller 16 issues a copyback request to the appropriate port and sets the duplicate tags for the requesting port to indicate "shared clean" (S) state and causes the external tags for the requesting port to indicate "shared clean" (S) state.

At block 108, the system controller 16 configures the data path switch 12 to supply the read data for the specified datablock to satisfy the read_to_share (RDS) transaction. The read data for the specified datablock is supplied to Port A from the main memory 14.

At block 110 the system controller 16 transfers a message via the Port A control path that causes the Port A external tags to transition from the "invalid" (I) state to the "exclusive clean" (E) state for the specified datablock.

At block 112, the system controller 16 sets the duplicate tags for port A from the "invalid" (I) to the "exclusive and potentially modified" state for the datablock via the snoop bus 58.

Thereafter, a read transaction issued from another memory port and targeted for the same datablock as the read_to_share (RDS) transaction above causes the system controller 16 to issue a copyback request to the memory Port A because the duplicate tags for Port A indicate the "exclusive and potentially modified" state for the datablock. Such a copyback operation occurs whether or not the processor of Port A has modified that datablock. As a consequence, such a copyback operation may be unnecessary to maintain data coherency in the computer system 10.

Figure 6:
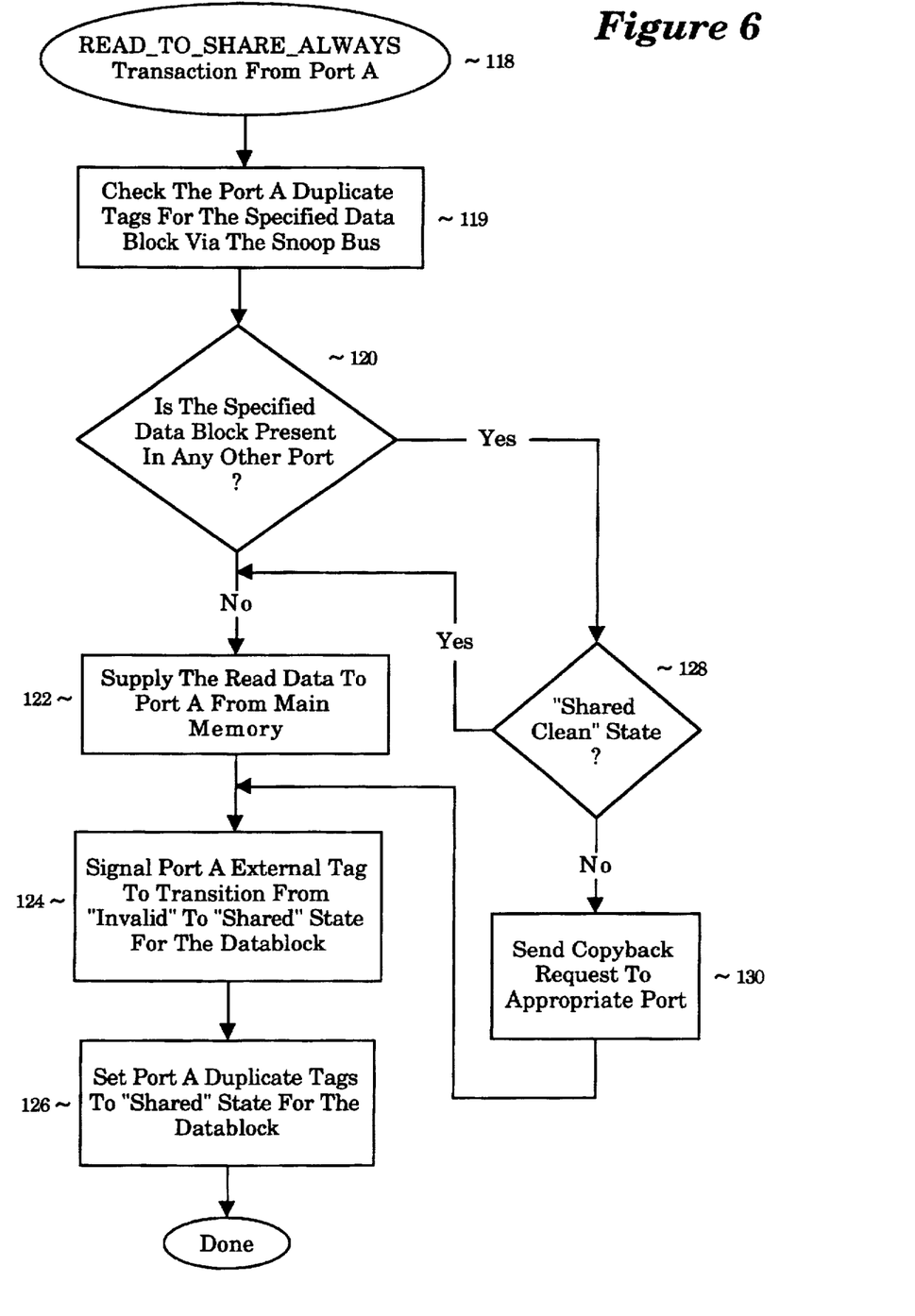
FIG. 6 illustrates the handling of a read_to_share_always (RDSA) transaction by the system controller.

FIG. 6 illustrates the handling of a read_to_share_always (RDSA) transaction from Port A by the system controller 16. At block 118, the system controller 16 receives a read_to_share_always (RDSA) request from the memory Port A.

At block 119, the system controller 16 reads the duplicate tags that correspond to the memory Port A via the snoop bus 58 for the specified datablock of the read_to_share_always (RDSA) transaction. At decision block 120, if the specified datablock is not owned by any other memory port 1–N, control proceeds to block 122. Otherwise, control proceeds to decision block 128.

At block 122, the system controller 16 configures the data path switch 12 to supply the read data for the specified datablock to satisfy the read_to_share_always (RDSA) transaction. The read data for the specified datablock is supplied to Port A from the main memory 14.

At block 124, the system controller 16 transfers a message to the memory Port A via the Port A control path that causes the external tags to transition from the "invalid" (I) state to the "shared clean" (S) state for the specified datablock.

At block 126, the system controller 16 sets Port A duplicate tags to the "shared clean" (S) state for the specified datablock via the snoop bus 58.

At decision block 128, if the specified datablock is held by another port in the "shared clean" (S) state, then control proceeds to block 122. If the specified datablock is held by another port in one of the modified states M or O, then the system controller issues a copyback request at block 130 to the appropriate port to supply the datablock to Port A, and control then proceeds to block 124 to update the external and duplicate tags as described above.

Thereafter, a read transaction issued from another memory port and targeted for the same datablock as the read_to_share_always (RDSA) transaction above the system controller 16 does not cause a copyback request to the memory Port A because the duplicate tags for Port A indicate the "shared clean" (S) state for the datablock. Since the read_to_share_always (RDSA) transaction is issued only for read-only data, it follows that the corresponding datablock in the Port A external cache remains in the "shared clean" (S) state. As a consequence, an unnecessary copyback operation is avoided while data coherency in the computer system 10 is maintained.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system, comprising:
   shared memory having a plurality of read-only datablocks;
   first and second processor subsystems each having an external cache memory including external tags for datablocks stored in the external cache memory, wherein if a cache miss on a requested datablock to the external cache memory occurs the processor subsystem generates one of a read to share always request if the requested datablock is one of said plurality of read-only datablocks and a read to share request; and memory interconnect that enables access to the shared memory and that includes circuitry for receiving the read to share and the read to share always request, and for allowing the requested datablock to be stored in the external cache memory, and that causes the external tags for the requested datablock to indicate an exclusive state in response to the read to share request only if no other processor subsystem has a copy of the requested datablock, and that causes the external tags for the requested datablock to indicate a shared state in response to the read to share always request.

2. The computer system of claim 1, wherein the memory interconnect maintains duplicate tags that correspond to the external tags and sets the duplicate tags that correspond to the external tags for the requested datablock to indicate a modified state in response to the read to share request and sets the duplicate tags that correspond to the external tags for the requested datablock to indicate the shared state in response to the read to share always request.

3. The computer system of claim 2, wherein the requested datablock is one of said plurality of read-only datablocks and contains instructions for the processor subsystem such that the processor subsystem generates the read to share always request rather than the read to share request.

4. The computer system of claim 2, wherein the processor subsystem in response to a read miss on the external cache generates the read to share always request if the requested datablock is one of said plurality of read-only datablocks and generates the read to share request otherwise.

5. The computer system of claim 4, wherein the circuitry that receives the read to share or the read to share always request comprises a system controller that accesses the duplicate tags via a snoop bus.

6. The computer system of claim 5, wherein the system controller causes the external tags for the requested datablock to indicate the exclusive state in response to the read to share request and causes the external tags for the datablock to indicate the shared state in response to the read to share always request by transferring a message to the processor subsystem via a control path coupling the system controller and the processor subsystem.

7. A multi-processor computer system having a plurality of processor subsystems, comprising:

shared memory having a plurality of read-only datablocks;

a first processor subsystem having an external cache memory including external tags for datablocks stored in the cache memory and that maintains the external tags according to a first coherency protocol; and memory interconnect that enables access to the shared memory and that includes duplicate tags that correspond to the external tags and that maintains the duplicate tags according to a second coherency protocol;

wherein the first processor subsystem generates a read to share always request that specifies one of said plurality of read-only datablocks if a cache miss on the specified read-only datablock to the external cache memory occurs, and wherein the memory interconnect in response to the read to share always request causes the external tags for the specified read-only datablock to indicate a shared state; and wherein the first processor subsystem generates a read to share request that specifies a requested datablock if a cache miss on the requested datablock to the external cache memory occurs and wherein the memory interconnect causes the external tags for the requested datablock to indicate an exclusive state in response to the read to share request only if no other processor subsystem has a copy of the requested datablock.

8. The computer system of claim 7, wherein the first coherency protocol is a MOESI coherency protocol and wherein the second coherency protocol is a MOSI coherency protocol.

9. The computer system of claim 7, wherein the memory interconnect sets the duplicate tags that correspond to the external tags for the requested datablock to indicate a modified state in response to the read to share request and sets the duplicate tags that correspond to the external tags for the specified read-only datablock to indicate the shared state in response to the read to share always request.

10. The computer system of claim 9, wherein the specified read-only datablock contains instructions for the processor subsystem such that the processor subsystem generates the read to share always request rather than the read to share request.

11. The computer system of claim 9, wherein the memory interconnect includes a system controller that accesses the duplicate tags via a snoop bus.

12. The computer of claim 11, wherein the system controller causes the external tags for the requested datablock to indicate the exclusive state in response to the read to share request and causes the external tags for the specified read-only data block to indicate the shared state in response to the read to share always request by transferring a message to the processor subsystem via a control path coupled between the system controller and the processor subsystem.

13. The computer system of claim 7, wherein the first coherency protocol is a MESI protocol and the second coherency protocol is a MSI protocol.

14. A cache coherency method in a multi-processor computer system, comprising the steps of:

maintaining external tags for datablocks stored in an external cache memory of a processor according to a first coherency protocol;

maintaining duplicate tags that correspond to the external tags according to a second coherency protocol; and one of generating a read to share always request that specifies a datablock if a cache miss on the datablock to the external cache memory occurs and the datablock lies in a read-only location in a main memory, and causing the external tags for the datablock to indicate a shared state in response to the read to share always request, and generating a read to share request that specifies the datablock if a cache miss on the datablock to the external cache memory occurs, and causing the external tags for the datablock to indicate an exclusive state in response to the read to share request after determining that no other processor owns the datablock.

15. The method of claim 14, wherein the the first coherency protocol is a MOESI coherency protocol and the second coherency protocol is a MOSI coherency protocol.

16. The method of claim 14, further comprising the steps of setting the duplicate tags that correspond to the external tags for the datablock to indicate a modified state in response to the read to share request and setting the duplicate tags that correspond to the external tags for the datablock to indicate the shared state in response to the read to share always request.

17. The method of claim 16, wherein the read to share always request is generated if the datablock lies in a read-only location in main memory, and the read to share request is generated otherwise in response to a read miss.

18. The method of claim 16, wherein the datablock contains instructions for the processor such that the read to share always request rather than the read to share request is generated.

19. The method of claim 14, wherein the first coherency protocol is a MESI protocol and the second coherency protocol is a MSI protocol.

* * * * *